(12) United States Patent
Ozawa

(10) Patent No.: US 7,404,293 B2
(45) Date of Patent: Jul. 29, 2008

(54) INTAKE SYSTEM FOR SUPERCHARGED ENGINE

(75) Inventor: Shigeyuki Ozawa, Shizuoka-ken (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/186,477

(22) Filed: Jul. 21, 2005

(65) Prior Publication Data

US 2006/0016437 A1 Jan. 26, 2006

(30) Foreign Application Priority Data

Jul. 22, 2004 (JP) ............................. 2004-214159

(51) Int. Cl.
F02B 33/44 (2006.01)
F02B 33/04 (2006.01)
F02B 37/10 (2006.01)
B60W 10/04 (2006.01)
B63B 35/73 (2006.01)

(52) U.S. Cl. .................. 60/611; 123/563; 123/564; 440/88 A; 440/84

(58) Field of Classification Search .............. 60/611, 60/600–603; 440/88 A, 84; 123/563–564
See application file for complete search history.

(56) References Cited

U.S. PATENT DOCUMENTS

| 1,871,662 A | 8/1932 | Carrier |
| 1,876,948 A | 9/1932 | Jahnke |
| 1,903,210 A | 3/1933 | Carrier |
| 1,974,974 A | 9/1934 | Puffer |
| 2,344,366 A | 3/1944 | Prince |
| 2,366,365 A | 1/1945 | Sorensen |
| 2,378,452 A | 6/1945 | Vincent |
| 2,406,388 A | 8/1946 | Larrecq |
| 2,523,588 A | 9/1950 | Ormsby |
| 2,565,060 A | 8/1951 | Beardsley et al. |
| 2,828,907 A | 4/1958 | Oehrli |

(Continued)

FOREIGN PATENT DOCUMENTS

EP 44348 A1 1/1982

(Continued)

OTHER PUBLICATIONS

A Translation of Kazunori Inagaki (Patent No. JP 10-089079 A).*

(Continued)

*Primary Examiner*—Thai-Ba Trieu
(74) *Attorney, Agent, or Firm*—Knobbe, Martens, Olson & Bear, LLP

(57) ABSTRACT

An intake system for a supercharged engine can include a blow-off passage provides communication between the upstream side of the throttle valve and the upstream side of a supercharger. A blow-off valve opens and closes the blow-off passage. The blow-off valve can be configured to open and close based upon pressure on the downstream side of the throttle valve. The present intake system can further comprise a first conduit providing communication between the upstream side of the throttle valve and the blow-off valve, a second conduit providing communication between the downstream side of the throttle valve and the blow-off valve, and a solenoid valve for switching between the first and second conduits.

7 Claims, 11 Drawing Sheets

U.S. PATENT DOCUMENTS

| | | |
|---|---|---|
| 2,847,186 A | 4/1958 | Anderson et al. |
| 2,973,894 A | 3/1961 | Kimball et al. |
| 3,137,281 A | 6/1964 | Fulker |
| 3,554,322 A | 1/1971 | Deutschmann et al. |
| 3,703,877 A | 11/1972 | Ueda |
| 3,995,603 A | 12/1976 | Thien et al. |
| 4,010,717 A | 3/1977 | Taplin |
| 4,035,171 A | 7/1977 | Reed et al. |
| 4,068,612 A | 1/1978 | Meiners |
| 4,198,217 A | 4/1980 | Erdmannsdorfer |
| 4,212,659 A | 7/1980 | Magrini |
| 4,267,811 A | 5/1981 | Springer |
| 4,285,632 A | 8/1981 | DeSalve |
| 4,300,488 A | 11/1981 | Cser |
| 4,319,657 A | 3/1982 | Nomura |
| 4,321,896 A | 3/1982 | Kasting |
| 4,326,374 A | 4/1982 | Streb |
| 4,353,211 A | 10/1982 | Cser et al. |
| 4,412,520 A | 11/1983 | Misuyasu et al. |
| 4,422,295 A | 12/1983 | Minami et al. |
| 4,459,808 A * | 7/1984 | Rydquist et al. ............... 60/602 |
| 4,475,617 A | 10/1984 | Minami et al. |
| 4,496,019 A | 1/1985 | Tanaka |
| 4,512,152 A | 4/1985 | Asaba |
| 4,513,725 A | 4/1985 | Minami et al. |
| RE31,877 E | 5/1985 | Nomura |
| 4,519,373 A | 5/1985 | Hardy et al. |
| 4,538,556 A | 9/1985 | Takeda |
| 4,553,515 A | 11/1985 | King et al. |
| 4,562,697 A | 1/1986 | Lawson |
| 4,630,446 A | 12/1986 | Iwai et al. |
| 4,633,826 A | 1/1987 | Tominaga et al. |
| 4,662,323 A | 5/1987 | Moriya |
| 4,674,457 A | 6/1987 | Berger et al. |
| 4,677,826 A | 7/1987 | Iwai et al. |
| 4,678,441 A | 7/1987 | Murase |
| 4,709,682 A | 12/1987 | Kato |
| 4,712,517 A | 12/1987 | Anno et al. |
| 4,718,396 A | 1/1988 | Shimada et al. |
| 4,723,526 A | 2/1988 | Horiuchi et al. |
| 4,738,229 A | 4/1988 | Wada et al. |
| 4,741,302 A | 5/1988 | Oda et al. |
| 4,760,703 A | 8/1988 | Minami et al. |
| 4,773,361 A | 9/1988 | Toki et al. |
| 4,781,553 A | 11/1988 | Nomura et al. |
| 4,796,574 A | 1/1989 | Fuji et al. |
| 4,797,068 A | 1/1989 | Hayakawa et al. |
| 4,827,722 A | 5/1989 | Torigai |
| 4,848,170 A | 7/1989 | Inagaki et al. |
| 4,887,692 A | 12/1989 | Outani et al. |
| 4,896,734 A | 1/1990 | Horiuchi et al. |
| 4,900,343 A | 2/1990 | Minami et al. |
| 4,936,278 A | 6/1990 | Umeda |
| 4,938,664 A | 7/1990 | Zinsmeyer |
| 4,955,352 A | 9/1990 | Takeda |
| 4,972,807 A | 11/1990 | Morishita |
| 4,982,682 A | 1/1991 | Hattori |
| 4,984,528 A | 1/1991 | Kobayashi |
| 4,984,974 A | 1/1991 | Naya et al. |
| 4,989,409 A | 2/1991 | Nakase et al. |
| 4,991,532 A | 2/1991 | Locke |
| 5,002,021 A | 3/1991 | Nakata et al. |
| 5,009,204 A | 4/1991 | Ishii |
| 5,014,816 A | 5/1991 | Dear et al. |
| 5,031,591 A | 7/1991 | Shinoda et al. |
| 5,060,622 A | 10/1991 | Suzuki |
| 5,088,280 A | 2/1992 | Scott-Scott et al. |
| 5,094,193 A | 3/1992 | Yoshikawa |
| 5,095,859 A | 3/1992 | Iwata et al. |
| 5,119,795 A * | 6/1992 | Goto et al. ................... 123/563 |
| 5,130,014 A | 7/1992 | Volz |
| 5,133,307 A | 7/1992 | Kurihara |
| 5,136,547 A | 8/1992 | Laukien |
| 5,136,993 A | 8/1992 | Ampferer et al. |
| 5,143,028 A | 9/1992 | Takahashi |
| 5,158,427 A | 10/1992 | Shirai |
| 5,159,903 A | 11/1992 | Takahashi |
| 5,163,811 A | 11/1992 | Okada |
| RE34,226 E | 4/1993 | Morishita |
| 5,215,164 A | 6/1993 | Shibata |
| 5,230,320 A | 7/1993 | Hitomi et al. |
| 5,239,950 A | 8/1993 | Takahashi |
| 5,243,945 A | 9/1993 | Katoh et al. |
| 5,253,618 A | 10/1993 | Takahashi et al. |
| 5,261,356 A | 11/1993 | Takahashi et al. |
| 5,293,846 A | 3/1994 | Takahashi |
| 5,299,423 A | 4/1994 | Shiozawa et al. |
| 5,330,374 A | 7/1994 | Ishino |
| 5,334,063 A | 8/1994 | Inoue et al. |
| 5,340,343 A | 8/1994 | Kawamukai et al. |
| 5,340,344 A | 8/1994 | Mineo et al. |
| 5,357,913 A | 10/1994 | Okumura et al. |
| 5,365,908 A | 11/1994 | Takii et al. |
| 5,377,629 A | 1/1995 | Brackett et al. |
| 5,377,634 A | 1/1995 | Taue |
| 5,389,022 A | 2/1995 | Kobayashi |
| 5,390,621 A | 2/1995 | Hattori et al. |
| RE34,922 E | 5/1995 | Hattori et al. |
| 5,438,946 A | 8/1995 | Kobayashi |
| 5,456,230 A | 10/1995 | VanRens et al. |
| 5,476,402 A | 12/1995 | Nakai et al. |
| 5,477,838 A | 12/1995 | Schlune et al. |
| 5,503,117 A | 4/1996 | Saito |
| 5,513,606 A | 5/1996 | Shibata |
| 5,529,027 A | 6/1996 | Okubo |
| 5,537,968 A | 7/1996 | Takahashi |
| 5,558,549 A | 9/1996 | Nakase et al. |
| 5,584,733 A | 12/1996 | Kobayashi |
| 5,586,922 A | 12/1996 | Kobayashi et al. |
| 5,603,301 A | 2/1997 | Sakurai et al. |
| 5,619,950 A | 4/1997 | Ikeda |
| 5,632,239 A | 5/1997 | Patyi et al. |
| 5,634,422 A | 6/1997 | Kobayashi et al. |
| 5,636,586 A | 6/1997 | Suganuma |
| 5,638,796 A | 6/1997 | Adams, III et al. |
| 5,647,779 A | 7/1997 | Nanami |
| 5,660,155 A | 8/1997 | Taue et al. |
| 5,660,571 A | 8/1997 | Nakayasu et al. |
| 5,664,515 A | 9/1997 | Hattori et al. |
| 5,671,703 A | 9/1997 | Otome et al. |
| 5,678,525 A | 10/1997 | Taue |
| 5,682,870 A | 11/1997 | Motoyama |
| 5,699,749 A | 12/1997 | Yamada et al. |
| 5,709,185 A | 1/1998 | Aizawa et al. |
| 5,709,186 A | 1/1998 | Taue |
| 5,709,198 A | 1/1998 | Sagisaka et al. |
| 5,743,206 A | 4/1998 | Hattori |
| 5,746,270 A | 5/1998 | Schroeder et al. |
| 5,755,194 A | 5/1998 | Moorman et al. |
| 5,769,039 A | 6/1998 | Taue et al. |
| 5,775,283 A | 7/1998 | Sawai et al. |
| 5,778,833 A | 7/1998 | Kuranishi |
| 5,778,838 A | 7/1998 | Taue |
| 5,778,857 A | 7/1998 | Nakamura et al. |
| 5,779,451 A | 7/1998 | Hatton |
| 5,797,778 A | 8/1998 | Ito et al. |
| 5,820,426 A | 10/1998 | Hale |
| 5,827,096 A | 10/1998 | Mineo |
| 5,829,402 A | 11/1998 | Takahashi et al. |
| 5,830,021 A | 11/1998 | Takahashi et al. |
| 5,839,930 A | 11/1998 | Nanami et al. |
| 5,845,618 A | 12/1998 | Taue et al. |
| 5,846,102 A | 12/1998 | Nitta et al. |
| 5,855,193 A | 1/1999 | Takahashi |

| | | | | | | |
|---|---|---|---|---|---|---|
| 5,871,340 | A | 2/1999 | Hatton | 2001/0044352 A1 | 11/2001 | Korenjak et al. |
| 5,871,380 | A | 2/1999 | Claussen | 2002/0025742 A1 | 2/2002 | Berthiaume et al. |
| 5,899,778 | A | 5/1999 | Hiraoka et al. | 2003/0015126 A1 | 1/2003 | Gokan |
| 5,902,161 | A | 5/1999 | Nakase | 2004/0253886 A1 | 12/2004 | Mashiko |
| 5,906,083 | A | 5/1999 | Olsen et al. | 2005/0172919 A1 | 8/2005 | Ozaki et al. |
| 5,908,337 | A | 6/1999 | Mashiko | 2005/0204730 A1 | 9/2005 | Tsukahara et al. |
| 5,911,211 | A | 6/1999 | Uchida | 2005/0247498 A1 | 11/2005 | Pichler et al. |
| 5,928,044 | A | 7/1999 | Mineo | 2005/0279092 A1 | 12/2005 | Ozawa |
| 5,934,070 | A | 8/1999 | Lagelstorfer | 2005/0279335 A1 | 12/2005 | Ozawa |
| 5,937,818 | A | 8/1999 | Kawai et al. | 2006/0054146 A1 | 3/2006 | Ozawa |
| 5,937,825 | A | 8/1999 | Motose | 2006/0060170 A1 | 3/2006 | Ozawa |
| 5,941,223 | A | 8/1999 | Kato | 2006/0243259 A1 | 11/2006 | Takahashi |
| 5,951,343 | A | 9/1999 | Nanami et al. | 2007/0215118 A1 * | 9/2007 | Komori et al. ............ 123/559.1 |
| 5,957,072 | A | 9/1999 | Hattori | | | |
| 5,957,112 | A | 9/1999 | Takahashi et al. | | FOREIGN PATENT DOCUMENTS | |
| 5,960,770 | A | 10/1999 | Taue et al. | EP | 0 500 139 B1 | 8/1992 |
| 5,983,878 | A | 11/1999 | Nonaka et al. | FR | 1263608 | 6/1961 |
| 6,006,540 | A | 12/1999 | Coletti | GB | 1389973 A | 4/1975 |
| 6,009,705 | A | 1/2000 | Arnott et al. | JP | 57-062929 | 4/1982 |
| 6,015,320 | A | 1/2000 | Nanami | JP | 57-062930 | 4/1982 |
| 6,015,321 | A | 1/2000 | Ozawa et al. | JP | 57-073817 | 5/1982 |
| 6,016,782 | A | 1/2000 | Henmi | JP | 57-073818 | 5/1982 |
| 6,022,252 | A | 2/2000 | Ozawa | JP | 57-073820 | 5/1982 |
| 6,026,775 | A | 2/2000 | Yamane | JP | 57-083632 | 5/1982 |
| 6,029,638 | A | 2/2000 | Funai et al. | JP | 57-093627 | 6/1982 |
| 6,041,758 | A | 3/2000 | Ishii | JP | 57-105537 | 7/1982 |
| 6,055,959 | A | 5/2000 | Taue | JP | 57-113922 | 7/1982 |
| 6,079,378 | A | 6/2000 | Taue et al. | JP | 57-113944 | 7/1982 |
| 6,085,702 | A | 7/2000 | Ito | JP | 57-151019 | 9/1982 |
| 6,099,371 | A | 8/2000 | Nozawa et al. | JP | 57-171027 | 10/1982 |
| 6,142,842 | A | 11/2000 | Watanabe et al. | JP | 57-181931 | 11/1982 |
| 6,149,477 | A | 11/2000 | Toyama | JP | 57-183512 | 11/1982 |
| 6,171,380 | B1 | 1/2001 | Wood et al. | JP | 57-191421 | 11/1982 |
| 6,205,987 | B1 | 3/2001 | Shigedomi et al. | JP | 57-203822 | 12/1982 |
| 6,213,062 | B1 | 4/2001 | Kawase | JP | 58-044221 | 3/1983 |
| 6,263,851 | B1 | 7/2001 | Henmi | JP | 58-053655 | 3/1983 |
| 6,269,797 | B1 | 8/2001 | Uchida | JP | 58-057023 | 4/1983 |
| 6,279,372 | B1 | 8/2001 | Zhang | JP | 58-082038 | 5/1983 |
| 6,286,492 | B1 | 9/2001 | Kanno | JP | 58-128925 | 8/1983 |
| 6,302,752 | B1 | 10/2001 | Ito et al. | JP | 58-170628 | 10/1983 |
| 6,312,299 | B1 | 11/2001 | Henmi | JP | 58-185927 | 10/1983 |
| 6,318,085 | B1 * | 11/2001 | Torno et al. .................... 60/611 | JP | 58-185929 | 10/1983 |
| 6,390,869 | B2 | 5/2002 | Korenjak et al. | JP | 58-185930 | 10/1983 |
| 6,394,060 | B2 | 5/2002 | Nagai et al. | JP | 58-185931 | 10/1983 |
| 6,394,777 | B2 | 5/2002 | Haavik | JP | 58-185932 | 10/1983 |
| 6,415,759 | B2 | 7/2002 | Ohrnberger et al. | JP | 58-192924 | 11/1983 |
| 6,447,351 | B1 | 9/2002 | Nanami | JP | 58-194695 | 11/1983 |
| 6,453,890 | B1 | 9/2002 | Kageyama et al. | JP | 59-018228 | 1/1984 |
| 6,497,596 | B1 | 12/2002 | Nanami | JP | 59-053229 | 3/1984 |
| 6,516,789 | B1 | 2/2003 | Jones | JP | 59-176419 | 10/1984 |
| 6,517,397 | B1 | 2/2003 | Gohara et al. | JP | 59-201932 | 11/1984 |
| 6,544,086 | B2 | 4/2003 | Tscherne et al. | JP | 59-220492 | 12/1984 |
| 6,568,376 | B2 | 5/2003 | Sonnleitner et al. | JP | 60-119328 | 6/1985 |
| 6,578,508 | B2 | 6/2003 | Hattori et al. | JP | 60-150445 | 8/1985 |
| 6,591,819 | B2 | 7/2003 | Tscherne et al. | JP | 60-240522 | 11/1985 |
| 6,601,528 | B2 | 8/2003 | Bilek et al. | JP | 60-240523 | 11/1985 |
| 6,623,321 | B2 | 9/2003 | Ishino | JP | 60-240524 | 11/1985 |
| 6,626,140 | B2 | 9/2003 | Aichinger et al. | JP | 60-240525 | 11/1985 |
| 6,637,406 | B2 | 10/2003 | Yamada et al. | JP | 61-126324 | 6/1986 |
| 6,640,754 | B1 | 11/2003 | Iida | JP | 61-126325 | 6/1986 |
| 6,644,942 | B2 | 11/2003 | Rival et al. | JP | 61-215123 | 9/1986 |
| 6,651,633 | B1 | 11/2003 | Jones | JP | 61-237824 | 10/1986 |
| 6,663,366 | B2 | 12/2003 | Okada et al. | JP | 62-060926 | 3/1987 |
| 6,672,918 | B2 | 1/2004 | Mashiko et al. | JP | 62258130 A * | 11/1987 |
| 6,746,288 | B2 | 6/2004 | Gokan | JP | 01-119421 | 5/1989 |
| 6,769,942 | B2 | 8/2004 | Bourret et al. | JP | 01-182560 | 7/1989 |
| 6,793,546 | B2 | 9/2004 | Matsuda | JP | 01-211615 | 8/1989 |
| 6,796,126 | B2 | 9/2004 | Hasegawa et al. | JP | 01-229786 | 9/1989 |
| 6,810,855 | B2 | 11/2004 | Hasegawa et al. | JP | 01-232112 | 9/1989 |
| 6,896,566 | B2 | 5/2005 | Takahashi et al. | JP | 01-232113 | 9/1989 |
| 6,973,985 | B2 | 12/2005 | Yatagai et al. | JP | 01-232115 | 9/1989 |
| 7,007,682 | B2 | 3/2006 | Takahashi et al. | JP | 01-232116 | 9/1989 |
| 7,101,238 | B2 | 9/2006 | Aichinger et al. | | | |

| | | |
|---|---|---|
| JP | 01-232118 | 9/1989 |
| JP | 01-301917 | 12/1989 |
| JP | 01-301918 | 12/1989 |
| JP | 01-301919 | 12/1989 |
| JP | 01-313624 | 12/1989 |
| JP | 02-006289 | 1/1990 |
| JP | 02-016327 | 1/1990 |
| JP | 02-024282 | 1/1990 |
| JP | 02-024283 | 1/1990 |
| JP | 02-024284 | 1/1990 |
| JP | 02-070920 | 3/1990 |
| JP | 02-119636 | 5/1990 |
| JP | 02-175491 | 7/1990 |
| JP | 02-188624 | 7/1990 |
| JP | 02-201026 | 8/1990 |
| JP | 02-294520 | 12/1990 |
| JP | 03-021584 | 1/1991 |
| JP | 03-023317 | 1/1991 |
| JP | 03-047425 | 2/1991 |
| JP | 03-168352 | 7/1991 |
| JP | 03-179152 | 8/1991 |
| JP | 03-182626 | 8/1991 |
| JP | 03-182635 | 8/1991 |
| JP | 03260368 | 11/1991 |
| JP | 03-281939 | 12/1991 |
| JP | 04-081325 | 3/1992 |
| JP | 04-203317 | 7/1992 |
| JP | 07-311626 | 11/1992 |
| JP | 05-141260 | 6/1993 |
| JP | 05-141262 | 6/1993 |
| JP | 05-332188 | 12/1993 |
| JP | 06-093869 | 4/1994 |
| JP | 06-212986 | 8/1994 |
| JP | 07-091264 | 4/1995 |
| JP | 07-145730 | 6/1995 |
| JP | 07-151006 | 6/1995 |
| JP | 07-317545 | 12/1995 |
| JP | 07-317555 | 12/1995 |
| JP | 07-317556 | 12/1995 |
| JP | 07-317557 | 12/1995 |
| JP | 08-028280 | 1/1996 |
| JP | 08-028285 | 1/1996 |
| JP | 08061073 A * | 3/1996 |
| JP | 08-104286 | 4/1996 |
| JP | 08-104295 | 4/1996 |
| JP | 08-114122 | 5/1996 |
| JP | 08-114123 | 5/1996 |
| JP | 08-114124 | 5/1996 |
| JP | 08-114125 | 5/1996 |
| JP | 08-151926 | 6/1996 |
| JP | 08-151965 | 6/1996 |
| JP | 08-296449 | 12/1996 |
| JP | 08-319840 | 12/1996 |
| JP | 08-319901 | 12/1996 |
| JP | 09-184426 | 7/1997 |
| JP | 09-287465 | 11/1997 |
| JP | 09-287467 | 11/1997 |
| JP | 09-287470 | 11/1997 |
| JP | 09-287471 | 11/1997 |
| JP | 09-287472 | 11/1997 |
| JP | 09-287475 | 11/1997 |
| JP | 09-287486 | 11/1997 |
| JP | 10-008973 | 1/1998 |
| JP | 10-008974 | 1/1998 |
| JP | 10-089079 | 4/1998 |
| JP | 10-131818 | 5/1998 |
| JP | 10299525 A * | 11/1998 |
| JP | 2000-038968 | 2/2000 |
| JP | 3060489 | 4/2000 |
| JP | 2001-082160 | 3/2001 |
| JP | 2001-098960 | 4/2001 |
| JP | 2001-233276 | 8/2001 |
| JP | 2001-233277 | 8/2001 |
| JP | 2001-263076 | 9/2001 |
| JP | 2001280144 A * | 10/2001 |
| JP | 2001323819 | 11/2001 |
| JP | 2003-027952 | 1/2003 |
| JP | 2003-049654 | 2/2003 |
| JP | 2003-074445 | 3/2003 |
| JP | 2006-083713 | 3/2006 |

OTHER PUBLICATIONS

Co-pending U.S. Appl. No. 11/511,970, filed Aug. 29, 2006. Title: Small Planning Boat. Inventor: Mineo.

Co-pending U.S. Appl. No. 11/527,189, filed Sep. 26, 2006. Title: Installation Structure for Compressor. Inventor: Mineo.

* cited by examiner

INTAKE SYSTEM FOR SUPERCHARGED ENGINE

CROSS-REFERENCE TO RELATED APPLICATION

This application claims priority to Japanese application Serial No. 2004-214159, filed on Jul. 22, 2004, the entire contents of which are hereby expressly incorporated by reference.

BACKGROUND OF THE INVENTIONS

1. Field of the Inventions

The present inventions relate to intake systems for supercharged engines.

2. Description of the Related Art

Supercharged engines are conventionally used in small boats and vehicles such as automobiles. Intake systems in such engines are generally adapted to supply the engine with air that is compressed by the supercharger, which is disposed in an intake passage. Some intake systems for supercharged engines are configured with a blow-off passage including a blow-off valve disposed in the intake passage. The blow-off passage and blow-off valve are generally configured to prevent an excessive increase in pressure within the intake passage. (See Japanese Patent Application JP-A-Hei 10-89079, for example).

In such intake systems for supercharged engines, a throttle valve is provided in the intake passage between the engine and the supercharger, and the blow-off passage connects the upstream side of the throttle valve and the upstream side of the supercharger. The blow-off valve, which is located in the blow-off passage, opens when the pressure on the upstream side of the throttle valve exceeds the pressure on the downstream side, and exceeds a predetermined value. When the blow-off valve opens, the air on the upstream side of the throttle valve, namely, the air between the throttle valve and the supercharger, returns to the upstream side of the supercharger through the blow-off passage. The blow-off valve and the blow-off passage thereby prevent damage to a compressor of the supercharger that could be caused by excessive pressure produced during abrupt deceleration.

SUMMARY OF THE INVENTIONS

In the conventional intake system for a supercharged engine described above, when the throttle valve is abruptly opened for acceleration, the blow-off valve remains opened, since negative pressure is produced on the downstream side of the throttle valve, while positive pressure is produced on the upstream side. Thus, part of the supercharged air leaks to the upstream side of the supercharger from the blow-off valve, resulting in a reduction in the volume of air supplied to the engine. Since a large volume of air needs to be supplied to the engine during acceleration, any leaking can lead to poor acceleration performance.

Thus, in accordance with one embodiment, an intake system comprises an intake passage for drawing air to an engine. A supercharger is disposed in the intake passage for compressing the air supplied to the engine. A throttle valve is disposed downstream from the supercharger for regulating the volume of the air supplied to the engine. A blow-off passage provides communication between the upstream side of the throttle valve and the upstream side of the supercharger. A blow-off valve opens and closes the blow-off passage. A throttle rate-of-change detecting device detects a rate-of-change of a throttle valve opening. A blow off valve control system controls actuation of the blow-off valve based on pressure on the downstream side of the throttle valve, and actuates the blow-off valve to close the blow-off passage when a detection value from the throttle rate-of-change detecting device when the throttle valve is opened exceeds a preset rate-of-change value.

BRIEF DESCRIPTION OF THE DRAWINGS

The preferred embodiments of the present intake system for supercharged engine, illustrating its features, are discussed in detail below with reference to the figures described below. These embodiments depict the novel and non-obvious intake system shown in the accompanying drawings, which are for illustrative purposes only. These drawings including the following figures, in which like numerals indicate like parts.

DETAILED DESCRIPTION OF THE PREFERRED EMBODIMENTS

Figure 1:
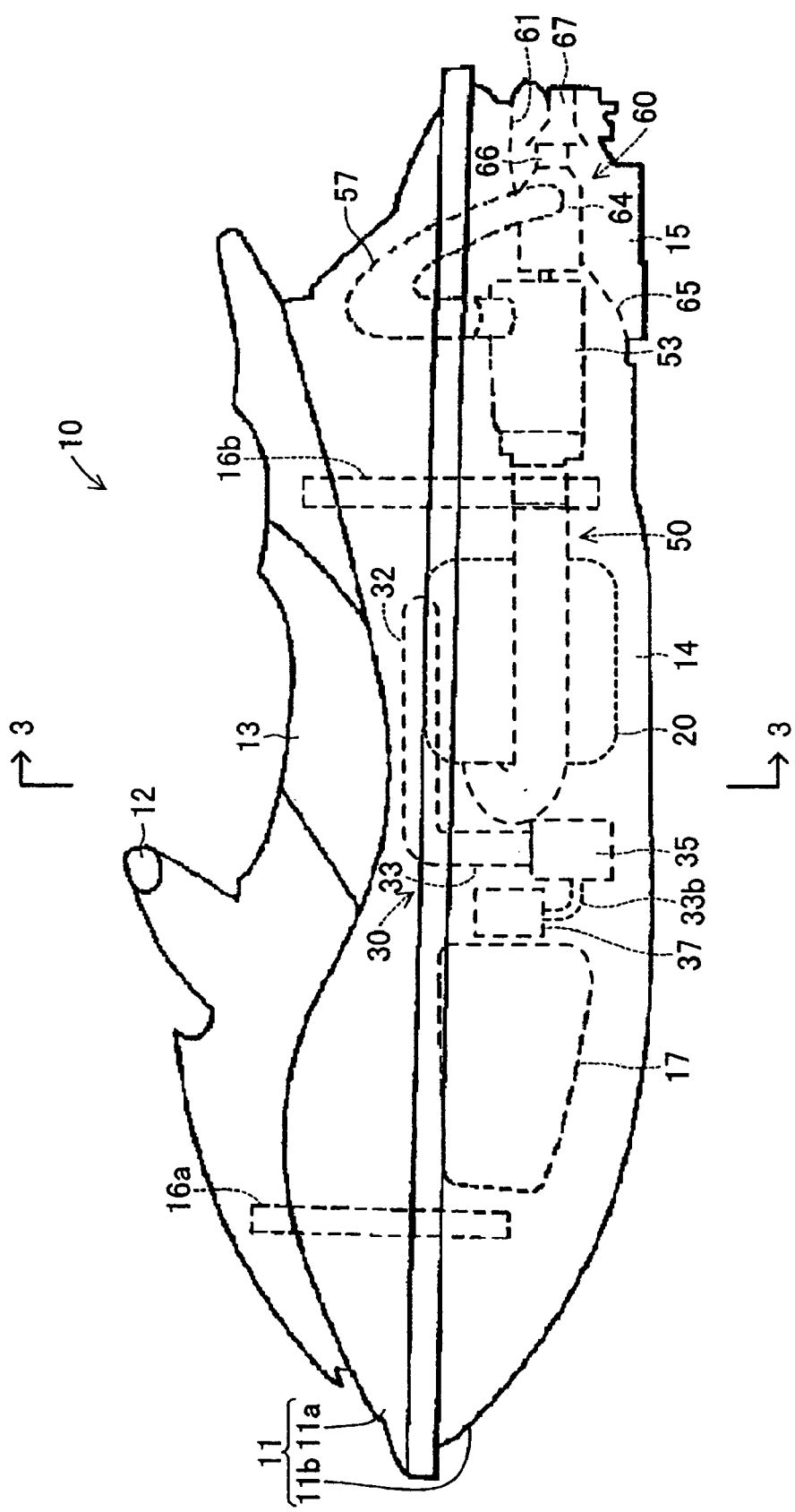
FIG. 1 is a side view of a planing boat that includes an embodiment of the present intake system.
Figure 2:
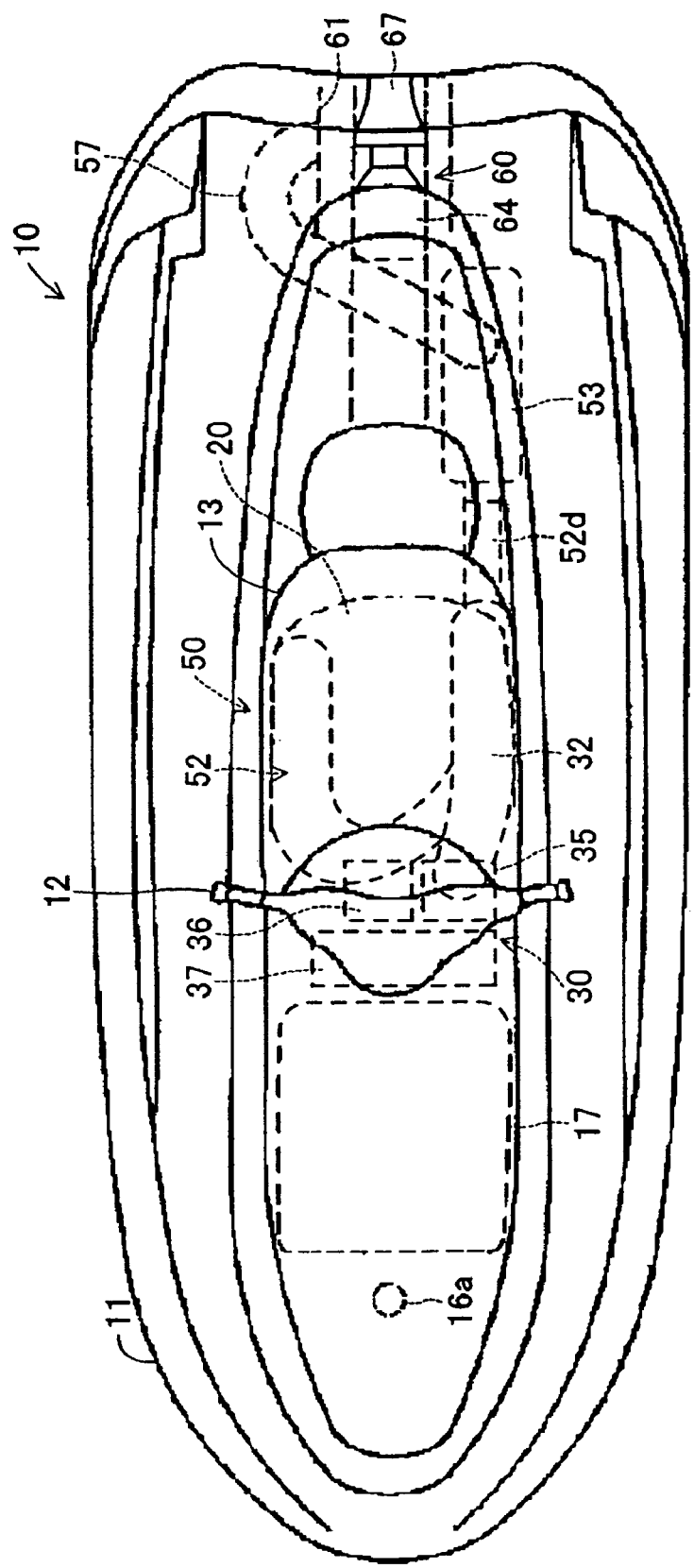
FIG. 2 is a top view of the planing boat of FIG. 1.

FIGS. 1 and 2 illustrate a planing boat 10, also known as a personal watercraft, having an intake system 30 in accordance with several embodiments. The intake system 30 is disclosed in the context of a personal watercraft because it has particular utility in this context. However, the intake system 30 can be used in other contexts, such as, for example, but without limitation, outboard motors, inboard/outboard motors, and for engines of other vehicles including land vehicles. In the illustrated embodiment, the planing boat 10 includes a plurality of components having the illustrated configuration. However, those of skill in the art will appreciate that the illustrated configuration is merely a one possible configuration, and that the components could be arranged in a variety of alternative ways.

The planing boat 10 can include a hull body 11 that can include a deck 11a and a lower hull 11b. Steering handlebars 12 can be disposed at a forward side portion relative to the center of an upper section of the hull body 11, and a seat 13 can be disposed in a center area of the upper section of the hull body 11. The inside of the hull body 11 can include an engine compartment 14 formed along the front to the mid parts of the hull body 11 and a pump compartment 15 formed on the rear part of the hull body 11.

With further reference to FIGS. 1 and 2, the engine compartment 14 can house an engine 20, and at least portions of the intake system 30, and an exhaust system 50. The pump compartment 15 can house a propulsion unit 60.

Air ducts 16a, 16b, which can be located forward and rearward of the inside of the engine compartment 14, can be configured to also ambient air to enter into and exit from the engine compartment 14. In the illustrated embodiment, the air ducts 16a, 16b extend vertically from the upper part of the hull body 11 toward the bottom of the engine compartment 14. Outside air can thus be drawn from the upper end of each air duct 16a, 16b through a waterproof structure (not shown) provided on the deck 11a, and introduced into the engine compartment 14 from the lower end of each air duct 16a, 16b.

A fuel tank 17 can be disposed forward of the engine compartment 14, and the engine 20 can be disposed at the center bottom of the inside the hull body 11. The engine 20 can be, for example, a water-cooled, four-stroke, in-line, four-cylinder engine. However, this is merely one type of engine that can be used. Other types of engines can be used which operate on other types of combustion principles (e.g., diesel, rotary, two-stroke), have other cylinder configurations (V-type, W-type, horizontally opposed, etc.), and have other numbers of cylinders.

Figure 3:
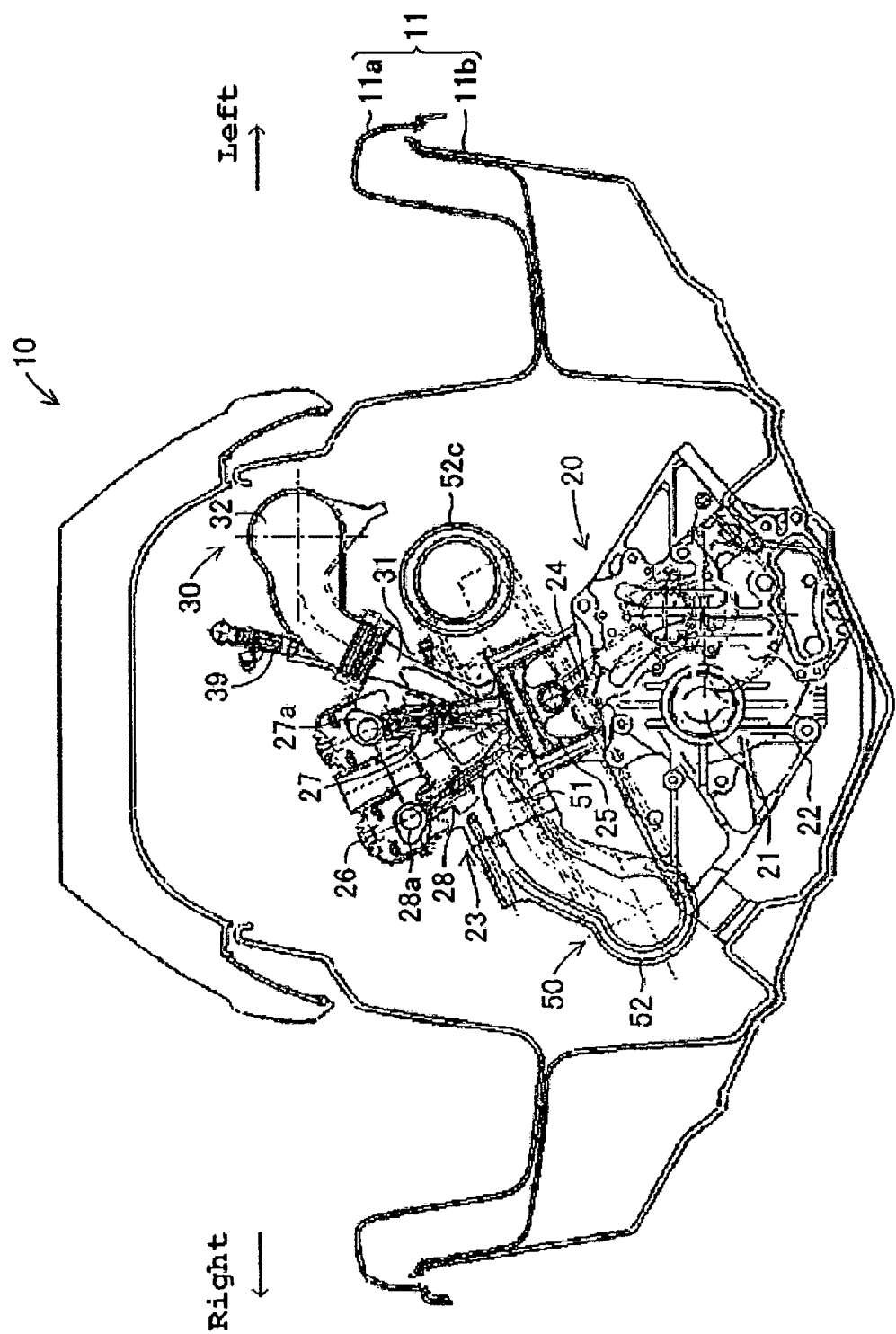
FIG. 3 is a cross-sectional view of the planing boat of FIG. 1, taken along the line 3-3 in FIG. 1.

As shown in FIG. 3, an outer shell of an engine body is formed by a crankcase 22 having a crankshaft 21 therein, and a cylinder body 23 formed above the crankcase 22. The cylinder body 23, which forms the upper part of the engine 20, can be oriented diagonally such that it extends toward the starboard side of the hull body 11.

The cylinder body 23 houses at least one piston 25, which is connected through a connecting rod 24 to the crankshaft 21. The piston 25 reciprocates within a cylinder 26 of the cylinder body 23. Movement of the piston 25 is transmitted to the crankshaft 21, which rotates about an axis that extends substantially front-to-back along the planing boat 10.

Each cylinder 26 can have at least one intake valve 27 and one exhaust valve 28, which are each driven by rotations of an intake camshaft 27a and an exhaust camshaft 28a, respectively, connected to the crankshaft 21 via a timing belt (not shown).

With further reference to FIG. 3, the intake valve 27 of each cylinder 26 is in fluid communication with an intake port of the present intake system 30. The intake system 30 includes an intake manifold 31.

The exhaust valve 28 of each cylinder 26 is in fluid communication with an exhaust pipe. The exhaust pipe is connected to an exhaust system 50, which includes an exhaust manifold 51.

The intake valve 27 opens during each intake stroke to feed a mixture of air and fuel to each cylinder 26, and closes during each exhaust stroke. The air supplied to each cylinder 26 is provided through the intake system 30 via an intake port, and the fuel is supplied by a fuel supply system, which is discussed in detail below. The exhaust valve 28 opens during each exhaust stroke to feed burned gas discharged from each cylinder 26 through an exhaust port to the exhaust system 50, and closes during each intake stroke.

Figure 4:
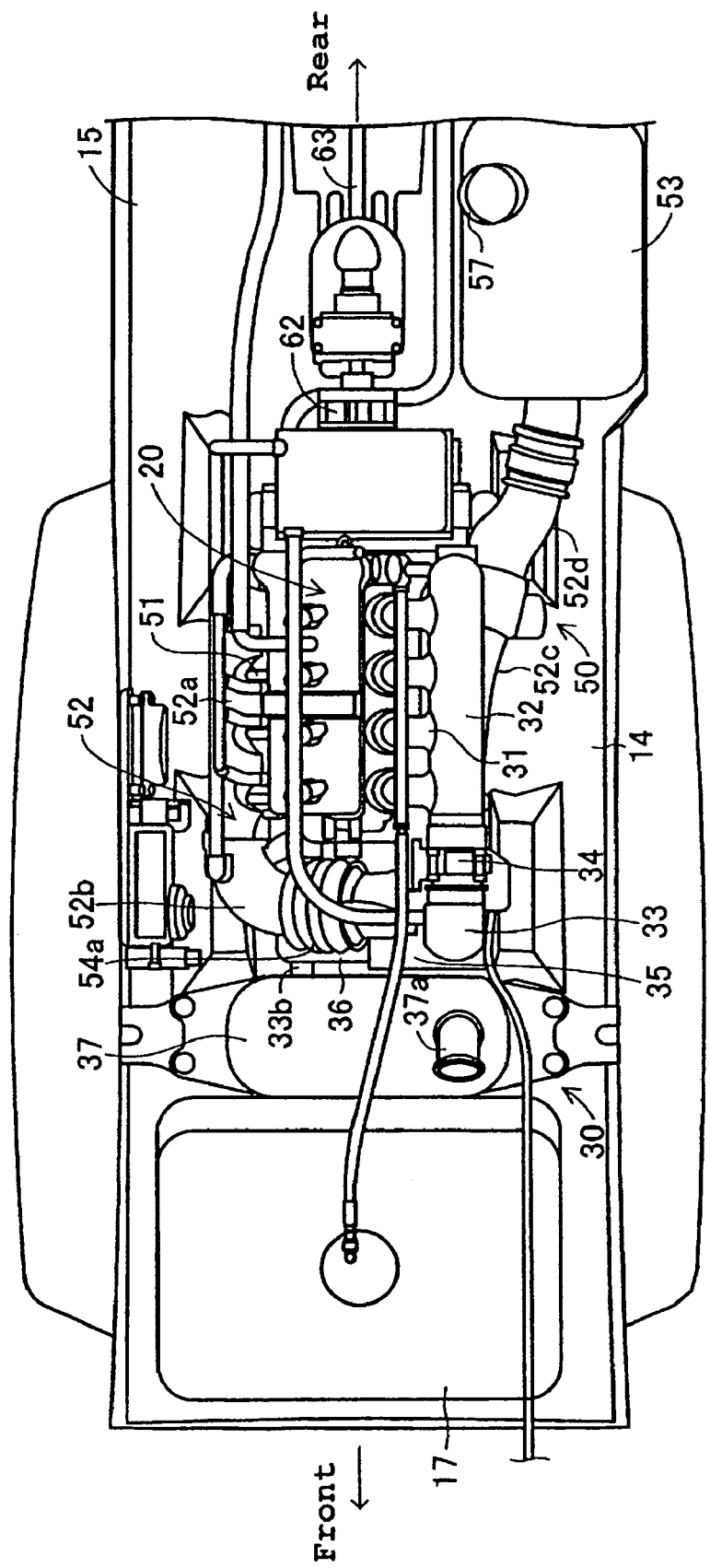
FIG. 4 is a top view of a preferred embodiment of the present intake system and an exhaust system connected to an engine.
Figure 5:
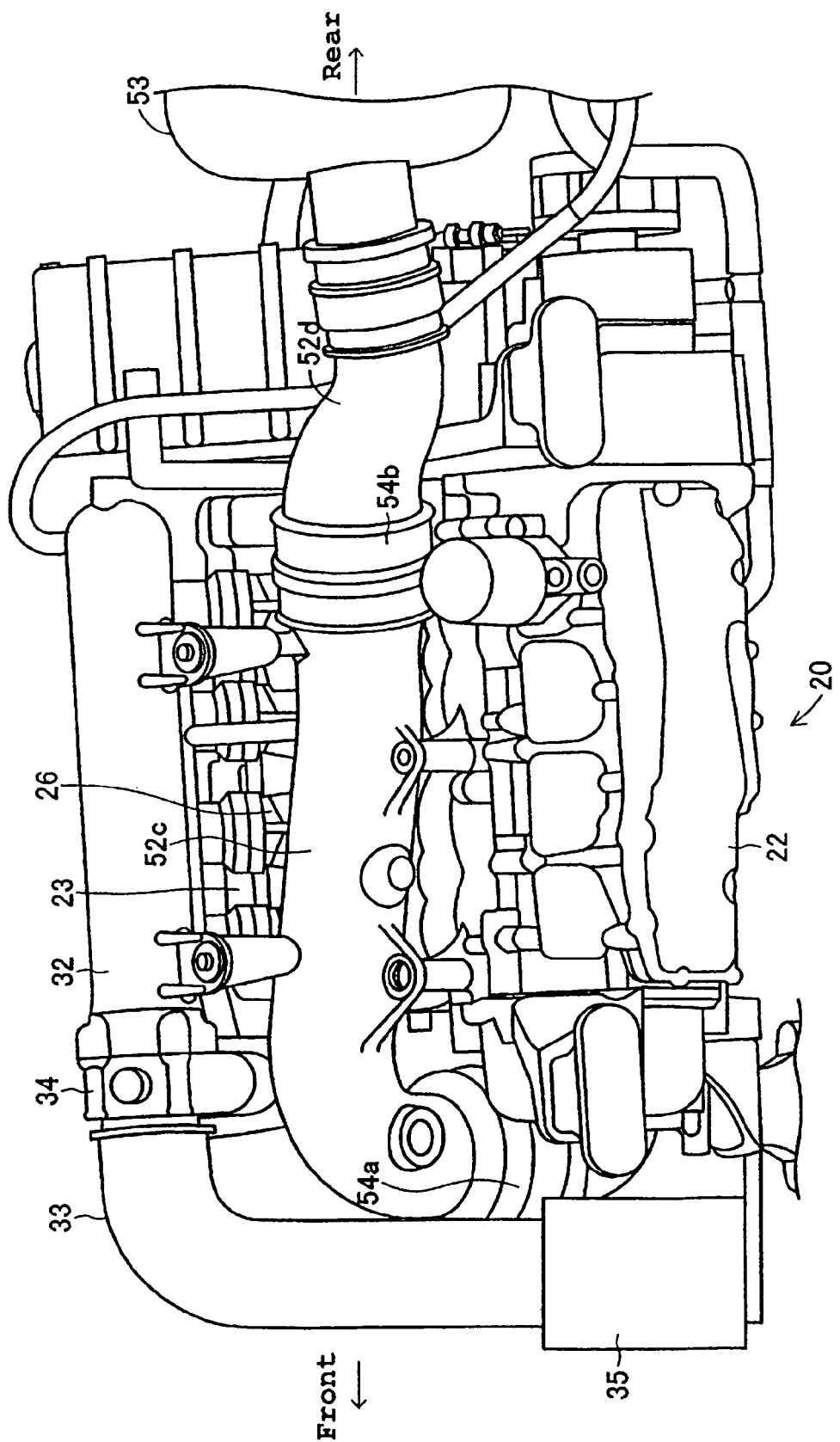
FIG. 5 is a port side elevational view, illustrating select components of the engine of FIG. 4.
Figure 6:
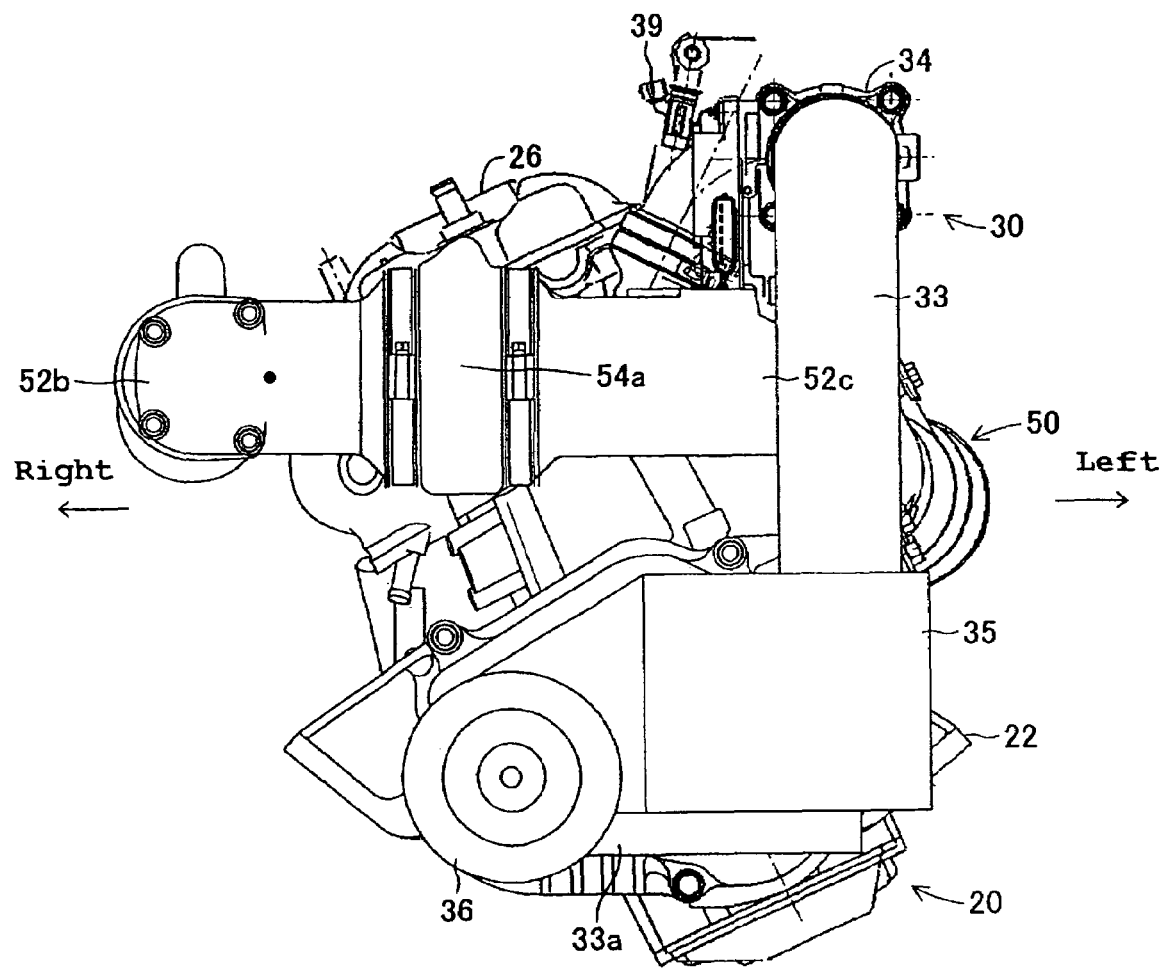
FIG. 6 is a front elevational view of the components of FIG. 5.

FIGS. 4-6 illustrate a configuration of the present intake system 30 and the exhaust system 50, which are both connected to the engine 20. The intake system 30 can includes an intake passage comprising the intake manifold 31, a surge tank 32, an air duct 33, and air passages 33a, 33b, all of which are configured as pipe members, although other components and configurations can also be used.

A throttle body 34 can be disposed between the surge tank 32 and the air duct 33. An intercooler 35 can be disposed between the air duct 33 and the air passage 33a. A super charger 36 can be disposed between the air passages 33a and 33b.

With reference to FIG. 4, an intake box 37 can be disposed at the upstream end of the air passage 33b. In systems such as the present intake system 30 and exhaust system 50, where liquid or gas flows from one side to the other, the side from which the liquid or gas is supplied is referred to as the upstream side, and the side to which the liquid or gas is supplied is referred to as the downstream side.

With continued reference to FIG. 4, the intake box 37 can be located between the engine 20 and the fuel tank 17, but slightly closer to the fuel tank 17 with a predetermined distance from the engine 20. This spacing helps to reduce the transfer of heat from the engine 20 to the air in the intake box 37.

Figure 7:
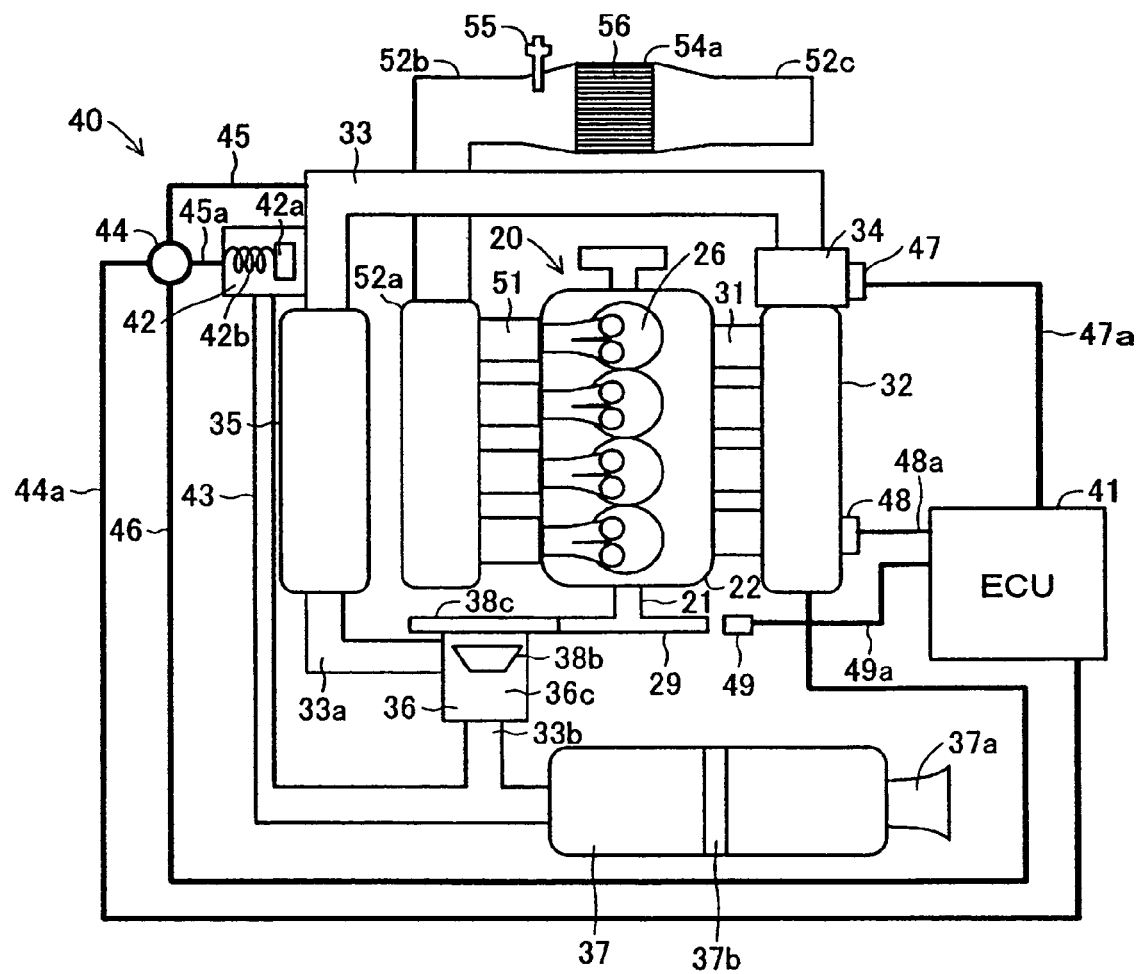
FIG. 7 is a schematic view of the intake system and an exhaust system illustrated in FIG. 4.

The upper surface of the intake box 37 can include a curved intake duct 37a that opens generally forwardly. The inside of the intake box 37 can include an air filter 37b as shown in FIG. 7.

During operation, air enters the engine compartment 14 in the planing boat 10 through the air ducts 16a, 16b (FIGS. 1 and 2). The intake box 37 draws air from the engine compartment 14 through the intake duct 37a (FIGS. 4 and 7). The air passes through the air filter 37b, which removes foreign matter, and is then fed to the supercharger 36 through the air passage 33b.

Figure 8:
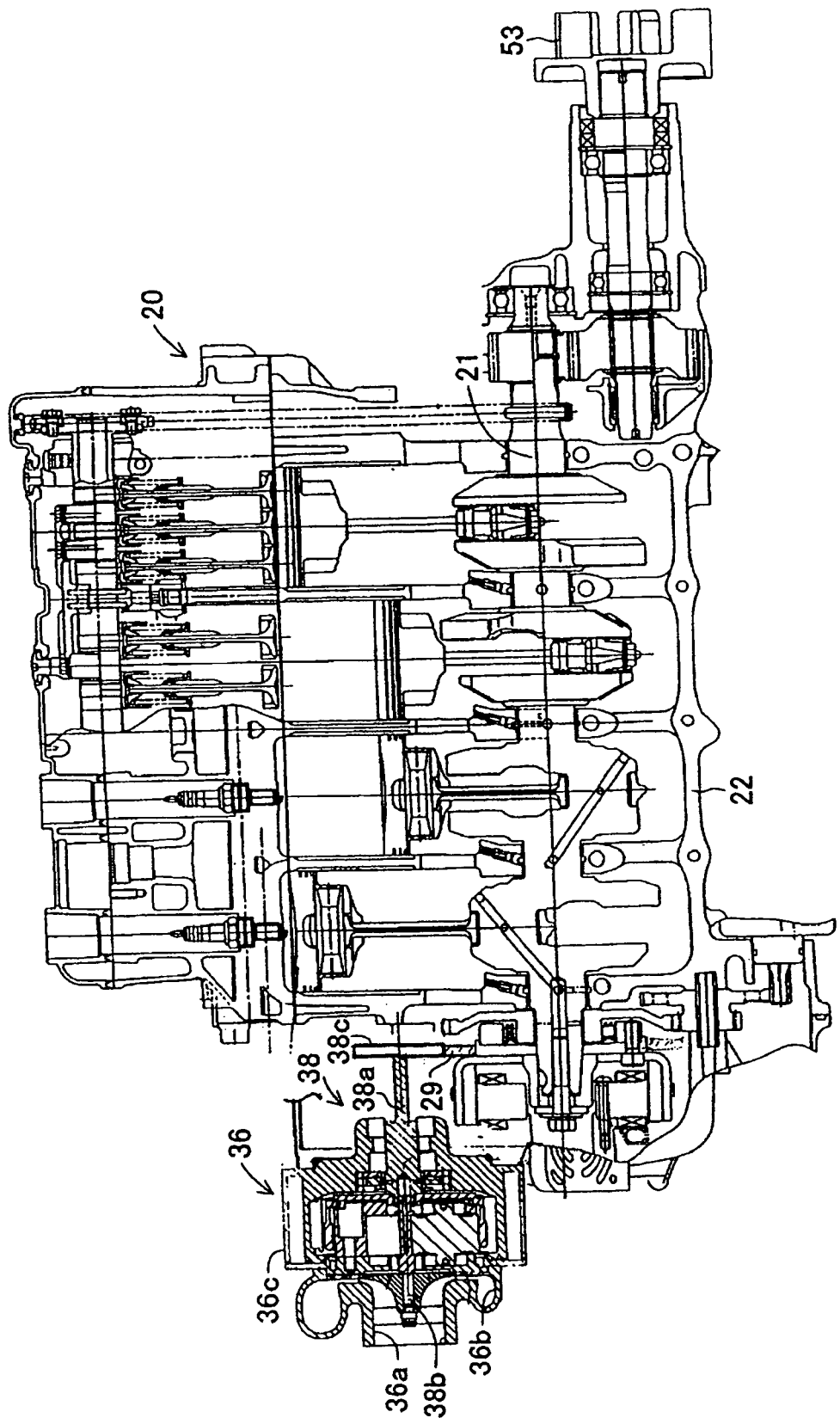
FIG. 8 is a partial cross-sectional, cut away, and port side elevational view of an engine and a supercharger that can be used with the present intake system.

In the illustrated embodiment, the supercharger 36 can be located close to the front end of the engine 20, slightly on the starboard side relative to the bottom center of the hull body 11. As shown in FIG. 8, the supercharger 36 can include a casing 36c.

The casing can include an intake port 36a connected to the air passage 33b for drawing the air fed from the intake box 37. The casing can further include a discharge port 36b connected to the air passage 33a for feeding the air drawn from the intake port 36a to the intercooler 35.

A rotary section 38 can be housed within the casing 36c, and can include a rotational shaft 38a and an impeller 38b connected to the front end thereof. The impeller 38b ca be positioned within the intake port 36a, and rotates together with the rotational shaft 38a.

A gear 38c can be disposed at a rear end of the rotational shaft 38a. A flywheel 29 at a front end of the crankshaft 21 engages the gear 38c to transmit rotational force from the crankshaft 21 to the rotary section 38. Thus, when the engine 20 operates to rotates the crankshaft 21, the rotational force is transmitted to the rotary section 38 via the flywheel 29 and the gear 38c, so that the impeller 38b can rotate. The rotation of the impeller 38b causes the air fed from the air passage 33b to the intake port 36a to be compressed and discharged from the discharge port 36b to the air passage 33a. The supercharger 36 compresses the air, and thereby heating the air.

With reference to FIGS. 4-6, the intercooler 35 can be located beside the supercharger 36 on the front end side of the engine 20, slightly on the port side relative to the bottom center of the hull body 11, although other positions can also be used. The intercooler 35 can be configured to cool the compressed air, which is fed from the supercharger 36 through the air passage 33a. Cooling the air in this manner can increase the air's density.

The higher-density compressed air is then fed to the throttle body 34 through the air duct 33. The air duct 33 can be arranged to as to extend upwardly, and optionally, generally vertically from the upper surface of the intercooler 35 and then can be curved so as to extend generally rearwardly to connect to the throttle body 34.

The throttle body 34 can be located forward of the port side face of the engine 20, on the upper side thereof, although other positions can also be used. The throttle body 34 can include a generally horizontal rotational shaft (not shown) and a disk-like throttle valve (not shown) attached to the shaft for rotation therewith, although other orientations can also be used. Rotation of the shaft allows the throttle valve to open or close the air path in the throttle body 34, thereby regulating or "metering" the flow rate of the air to be supplied to each cylinder 26.

With reference to FIGS. 4 and 5, the surge tank 32 can be connected to the rear end of the throttle body 34, and can be disposed along the upper part of the port side face of the engine 20. The surge tank 32 is preferably constructed of resin or aluminum alloy tubing, or any other material.

The intake manifold 31, which in the illustrated embodiment includes four branch pipes, extends from the surge tank 32 toward the starboard side. Each pair of adjacent branch pipes is spaced a predetermined distance as measured in the longitudinal direction. Each branch pipe of the intake manifold 31 also extends obliquely downwardly from the surge tank 32 (the upstream end) to the intake port of one of the cylinders 26 (the downstream end). The surge tank 32 can be configured to attenuate intake pulsations, which can occur in the compressed air supplied from the intercooler 35, so as to feed air into the intake manifold 31 at a consistent pressure.

A fuel supply system can be configured to supply fuel from the fuel tank 17 to the engine 20. The fuel supply system can include a fuel pump (not shown) and a fuel injector 39 (FIG. 3).

Fuel, which is pumped out of the fuel tank 17 by activating the fuel pump, is atomized and injected by the fuel injector 39 to each cylinder 26. In this process, the fuel is mixed, in the intake manifold 31, with the compressed air supplied from the intake box 37 through the supercharger 36. This air-fuel mixture is fed to each cylinder 26.

The engine 20 can further include an ignition system. The air-fuel mixture in the cylinders 26 explodes when it is ignited by the ignition system. The explosion allows the piston to reciprocate within the cylinder 26, thereby rotating the crankshaft 21.

Figure 9:
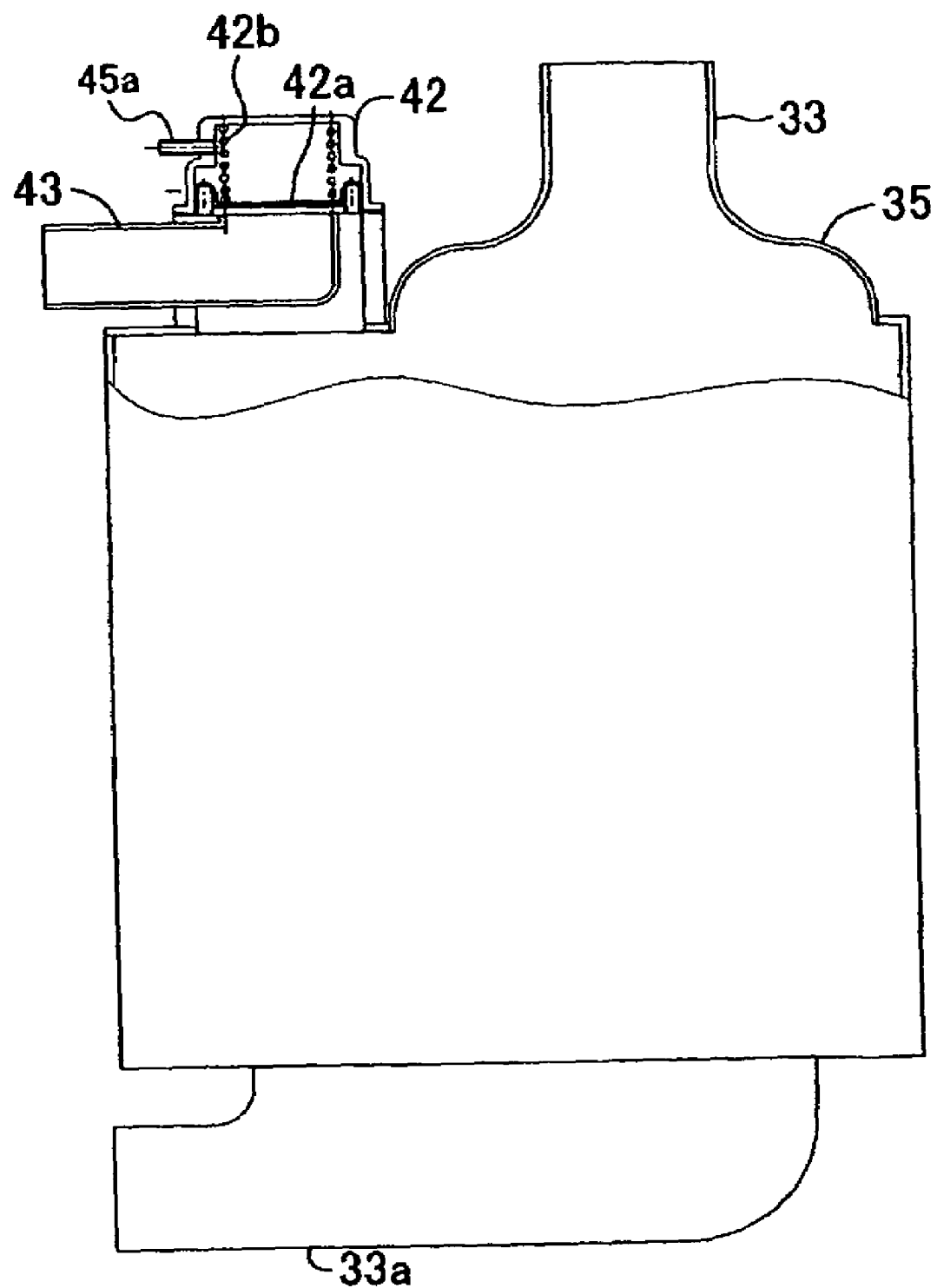
FIG. 9 is a partial cross-sectional view of a blow-off valve that can be used with the supercharger.

The present intake system 30 can further include a blow-off valve control system 40, shown in FIG. 7. The blow-off valve control system 40 includes an ECU (electric control unit) 41. The ECU 41 can include a control section comprising a CPU, a ROM, a RAM, and a timer, although other configurations and hardware components can also be used The blow-off valve control system 40 can further include a blow-off valve 42, and a blow-off passage 43. The blow-off valve 42 can be attached to the intercooler 35, as shown in FIG. 9 and can be in fluid communication with a portion of the intercooler 35 on the air duct 33 side. The blow-off valve 42 and the air passage 33b are connected via the blow-off passage 43.

With reference to FIGS. 7 and 9, the blow-off valve 42 can include a valve 42a, which normally closes an opening of the blow-off passage 43 to thereby disconnect the air duct 33 from the blow-off passage 43. The blow-off valve 42 can further includes a spring member 42b that is configured to bias the valve body 42a toward the opening of the blow-off passage 43.

During operation, when the throttle valve is closed, the pressure within the air duct 33 and the air passage 33a may increase and exceed a predetermined value. The blow-off valve 42 can be configured such that the excess pressure opens the blow-off valve 42 by forcing the valve body 42a to move against the urging force of the spring member 42b. The opening of the blow-off valve 42 opens fluid communication between the air duct 33 and the blow-off passage 43. When the blow-off valve 42 opens, air in the air duct 33 flows from the blow-off passage 43 to the air passage 33b, and then toward the supercharger 36.

Operation of the blow-off valve 42 can prevent an excessive increase in pressure within the air passage 33a, which might damage the impeller 38b of the supercharger 36. With reference to FIGS. 7 and 9, the blow-off valve 42 can be connected to a three-way switching solenoid valve 44 through a connecting passage 45a. In the illustrated embodiment, the solenoid valve 44 can be connected to the air duct 33 by a first pressure-introducing passage 45, and to the surge tank 32 by a second pressure introducing passage 46. The pressure-introducing passages 45, 46 may comprise hoses, for example. The connecting passage 45a can comprise part of the pressure-introducing passages 45, 46. The single solenoid valve 44 can advantageously be configured to perform the functions that might otherwise be performed by first and second control valves.

With reference to FIG. 7, wiring 44a connects the solenoid valve 44 to the ECU 41. The ECU 41 can be configured to control the solenoid valve 44 to open communication between the blow-off valve 42 and the first pressure introducing passage 45 and close communication between the blow-off valve 42 and the second pressure introducing passage 46, or to open communication between the blow-off valve 42 and the second pressure introducing passage 46 and close communication between the blow-off valve 42 and the first pressure introducing passage 45. In some embodiments, opening and closing of the blow-off valve 42 is influenced by the pressure within the pressure introducing passages 45, 46.

With further reference to FIG. 7, the throttle body 34 can include a throttle sensor 47, that can be configured to detect a rate-of-change of the opening of the throttle valve. The surge tank 32 can include a pressure sensor 48, that can be configured to detect a pressure within the surge tank 32. A pulser 49, disposed near the flywheel 29, can be configured to detect engine speed by detecting a rotational speed of the flywheel 29, in a manner well known in the art.

The throttle sensor 47, pressure sensor 48 and pulser 49 can each be connected to the ECU 41 through wiring 47a, 48a, 49a, respectively, and each can send a detection signal to the ECU 41. The ECU 41 can control, for example but without limitation, actuation of a motor for switching the solenoid valve 44 and driving the throttle valve, based on values contained in the detection signals.

With further reference to FIG. 7, the exhaust system 50 can include the exhaust manifold 51 (described in detail above) that feeds into an exhaust pipe 52, and a water lock 53 (FIGS. 1, 2 and 4) connected to the downstream end of the exhaust pipe 52. However, other components can also be used. As shown in FIGS. 3 and 4, each branch pipe of the exhaust manifold 51 extends obliquely downwardly from the exhaust port of its respective cylinder 26 (its upstream end), and leads to the exhaust pipe 52 (its downstream end). With reference to FIGS. 1, 2 and 4, the exhaust pipe 52 extends forward along the bottom and starboard side face of the engine 20, then curves around the front end of the engine 20, and extends rearward along the port side face.

With reference to FIGS. 4 and 7, the exhaust pipe 52 can comprise a first muffler 52a connected to the downstream end of each furcated exhaust pipe 51, a ring joint 52b connected to the downstream end of the first muffler 52a, a second muffler 52c connected to the downstream end of the ring joint 52b, and an exhaust hose 52d connected to the downstream end of the second muffler 52c. In the illustrated embodiment, the first muffler 52a is disposed along the bottom and starboard side face of the engine 20. Its upstream end is closed while its downstream end reaches a position corresponding to the front end of the engine 20.

The downstream end of the first muffler 52a can be connected to the upstream end of the ring joint 52b, which curves about 90-degrees around the front of the engine 20. The ring joint 52b extends obliquely upward while curving along the corner of the engine 20, until its downstream end reaches generally the center of the front face of the engine 20 as shown in FIG. 6. The second muffler 52c is connected to the downstream end of the ring joint 52b via a joint 54a. The second muffler 52c initially extends along the front face of the engine 20, and then extends rearward along generally the vertical center of the port side face of the engine 20.

More specifically, portions of the ring joint 52b and the second muffler 52c which are positioned forward of the engine 20 extend to cover the upper faces of the supercharger 36 and the intercooler 35. The second muffler 52c is positioned below the surge tank 32. The downstream end of the second muffler 52c is connected to the upstream end of the exhaust hose 52d via a joint 54b, and the downstream end of the exhaust hose 52d is connected to the water lock 53.

With reference to FIG. 7, near a location where the joint 54a and the second muffler 52c are connected, the exhaust pipe 52 includes an oxygen detecting sensor 55 for detecting oxygen in discharged combustion gas. The exhaust pipe 52 further includes a catalyst 56 for purifying the combustion gas. The catalyst 56 may, for example, use a honeycomb catalyst element whose base material is coated with platinum to purify the exhaust gas passing through the catalyst element. Then, based on the quantity of oxygen detected by the oxygen detecting sensor 55, the ECU 41 controls the quantity of fuel supplied to the combustion chambers in order to keep the engine running efficiently (neither lean nor rich).

With reference to FIGS. 1, 2 and 4, in the illustrated embodiment the water lock 53 is formed as a large-diameter cylindrical tank. An exhaust gas pipe 57 extends rearwardly from the rear top surface of the tank. The upstream end of the exhaust gas pipe 57 communicates with the water lock 53, and its downstream part initially extends upward and then downward toward the rear as shown FIGS. 1 and 2. The downstream end of the exhaust gas pipe 57 is open toward a casing 61 for separating the propulsion unit 60 from the main unit of the hull body 11, and has access to the outside at the rear end of the hull body 11.

With reference to FIG. 4, a coupling 62 connects a pump drive shaft 63 to the crankshaft 21. The pump drive shaft 63 extends rearward from the rear of the engine 20 to the pump compartment 15. The pump drive shaft 63 is connected to an impeller (not shown) provided inside a jet pump 64 (FIGS. 1 and 2) disposed at the stem of the hull body 11. The pump drive shaft 63 can be formed of a single shaft member, or a plurality of shaft members connected together. The pump drive shaft 63 transmits the rotational force of the crankshaft 21, which is driven by the engine 20, to the impeller, which rotates.

In the illustrated embodiment, the jet propulsion unit 60 provided with the jet pump 64 is disposed on the center in the lateral direction of the hull body 11 at its rear end. With reference to FIG. 1, the propulsion unit 60 has a water inlet 65 with its opening located at the bottom of the hull body 11 and a water jet nozzle 66 with its opening located at the stem.

Seawater introduced from the water inlet 65 is ejected from the water jet nozzle 66 by activating the jet pump 64 to generate thrust for the hull body 11. The propulsion unit 60 is installed at the bottom at the stem of the hull body 11, and is preferably separated from the main unit of the hull body 11 by a casing 61. Thus, the pump drive shaft 63 passes through the casing 61 and extends from the engine 20 to the jet pump 64 of the propulsion unit 60.

With reference to FIGS. 1 and 2, a steering nozzle 67 is attached to the rear end portion of the jet pump 64. The steering nozzle 67 changes an advancing direction of the planning boat 10 rightward or leftward by allowing its rear portion to be moved rightward or leftward in response to operation of the steering handlebars 12. The planing boat 10 preferably has various devices for running safely, such as an electrical box accommodating various electrical equipment, a start switch, and various sensors.

Below, the driving operation of the planing boat 10 and the control by the ECU 41 is described. First, when the operator straddles the seat 13 and turns a start switch ON, the planning boat 10 becomes operable. Then, when the operator manipulates the steering handle bars 12 and a throttle operating member, or accelerator, (not shown) disposed at a grip of the steering handlebar 12, the planing boat 10 starts to run at a predetermined speed in a predetermined direction in response to the operator's actions.

Figure 10:
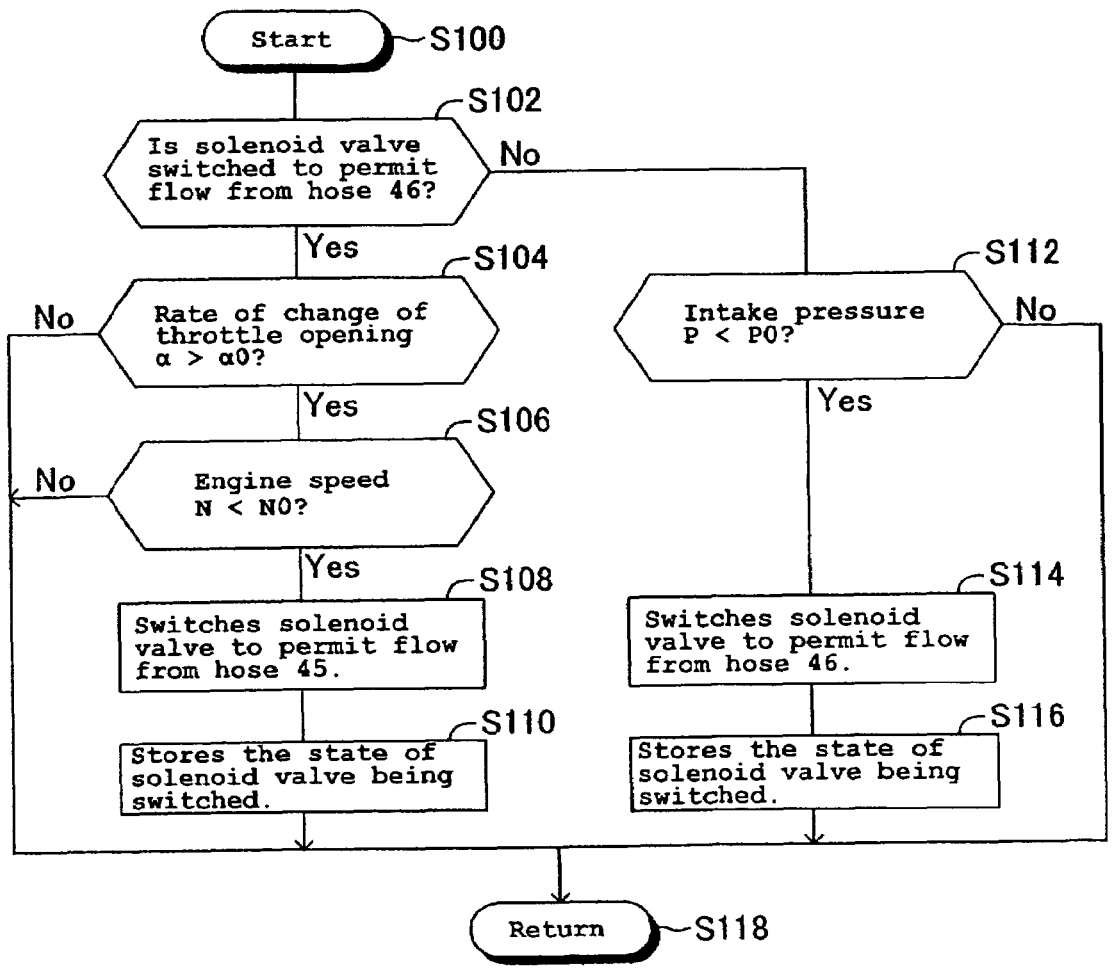
FIG. 10 is a flowchart illustrating a program that can be used in conjunction with the embodiments illustrated in FIGS. 1-9.

The program shown in the flowchart of FIG. 10 can begin to execute automatically when the operator turns the start switch ON, or at other times, and the program is re-executed at predetermined time intervals. This program is preferably prepared in advance and stored in the ROM of the ECU 41. Execution of the program allows throttle response control for closing the blow-off valve 42 when a rate-of-change of opening of the throttle valve detected by the throttle sensor 47) exceeds a preset value.

With reference to FIG. 10, the program begins at step S100. At step S102, the CPU of the ECU 41 determines whether or not the solenoid valve 44 is switched to permits flow from the second pressure introducing passage 46, that is, whether or not the blow-off valve 42 is in communication with the second pressure introducing passage 46. If the planing boat 10 is ready to start running from the stopping state, then the solenoid valve 44 is in the state of being switched to permit flow from the second pressure introducing passage 46, which is described below. Accordingly, the CPU determines "YES" at step S102 and the program goes to step S104.

At step S104, a determination is made as to whether or not a rate-of-change change of a throttle opening a, detected by the throttle sensor rate-of-change value $\alpha_0$. The preset rate-of-change value $\alpha_0$ is the value preset and stored in the RAM. The preset rate-of change value a may be set, for example, at a value corresponding to the rate-of-change of throttle opening when the planing boat operator rapidly opens up the throttle (by rapidly depressing or turning the accelerator) in order to quickly accelerate the planing boat 10. If the operator has not yet operated the accelerator, or has operated the accelerator slowly, such that the rate-of-change of throttle opening a is not greater than the preset rate-of change value $\alpha_0$, the program determines "NO" at step S104. Then, the program goes to step S118 and temporarily ends.

Upon restarting, the program begins at step S100 and proceeds through step S102 (as described above) to step S104. In the meantime, the solenoid valve 44 remains switched to permit flow from the second pressure introducing passage 46, and the intake system 30 operates in accordance with such state. Then, the planing boat 10 runs at a speed in accordance with the operator's manipulation of the accelerator. Meanwhile, when the rate-of-change of throttle opening a becomes greater than the preset rate-of-change value $\alpha_0$ through operator's operation of the accelerator, and "YES" is determined at step S104, the program goes to step S106.

Figure 11:
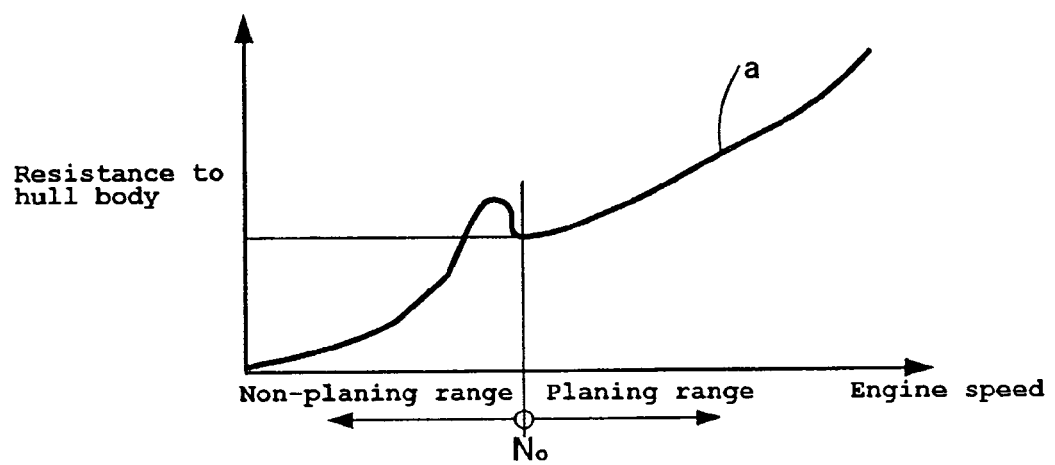
FIG. 11 is a graph illustrating an exemplary but non-limiting relation between engine speed and resistance to the hull body of a watercraft during operation.

At step S106, a determination is made as to whether or not the engine speed $N_0$ which can be detected by the pulser 49, is less than a preset speed value $N_0$. The preset speed value $N_0$ may be set, for example, based on the engine speed when the running state of the planing boat 10 is on the border between a planing range and a non-planing range, as shown in FIG. 11. As FIG. 11 illustrates with the curve a, the relation between engine speed and the resistance that the planing boat receives at its hull body from the water is generally proportional.

However, immediately before the running state of the planing boat 10 shifts to the planing range from the non-planing range after a gradual increase in its running speed, resistance to the hull body temporarily increases and then drops. In a preferred embodiment, the point at which such drop completes and then resistance to the hull body starts to increase may be set as the preset speed value No.

With reference to FIG. 10, when the running state of the planing boat 10 is in the non-planing range, and "NO" is determined at step S106, the program goes to the step S118 and temporarily ends. Then, the solenoid valve 44 remains switched to permit flow from the second pressure introducing passage 46, and the intake system 30 operates in accordance with such state. In the meantime, the planing boat 10 runs in the non-planing state at a relatively low speed. The program again starts at step S100, and continues through steps S102 and S104 as described above. Then, when the running state of the planing boat 10 shifts to the planing range, and "YES" is determined at step S106, the program goes to step S108.

At step S108, the ECU 41 switches the solenoid valve 44 based on the detection signals that the ECU 41 receives from the throttle sensor 47 and the pulser 49. The solenoid valve 44 switches to permit flow from the first pressure introducing passage 45. The blow-off valve 42 is thus disconnected from the second pressure introducing passage 46 and communicates with the first pressure introducing passage 45. In this state, one end of the first pressure introducing passage 45 is in communication with the air duct 33 while the other end of the passage 45 is in communication with the blow-off valve 42 via the solenoid valve 44 and the connecting passage 45a. Thus, the pressures on opposite sides of the blow-off valve 42 are equal, and the spring member 42b holds the valve body 42a against the opening of the blow-off passage 43 so that the blow-off valve 42 is closed.

When the blow-off valve 42 is closed, the compressed air being fed from the supercharger 36 flows through the air duct 33, the surge tank 32, etc. and into the engine 20 without leaking into the blow-off passage 43 through the blow-off valve 42. As a result, the speed of the engine 20 promptly increases, so that the planing boat 10 quickly accelerates. Then, the program goes to the step S110, where the state of the solenoid valve 44 being switched to permit flow from the first pressure introducing passage 45 is stored in RAM. Then, the program goes to the step S118 and temporarily ends.

The program is again started from step S100, and a determination is made as to whether or not the solenoid valve 44 is switched to permit flow from the second pressure introducing passage 46. At this point, during the most recent execution of the program, the solenoid valve 44 has been switched to permit flow from the first pressure introducing passage 45 (at step S108), and this state has been stored in RAM (at step S110). Accordingly, "NO" is determined at step S 102 and the program goes to step S 112.

At step S112, a determination is made as to whether or not a pressure P within the surge tank 32 (detected by the pressure sensor 48) is less than a preset value $P_0$. The present value $P_0$ is the value preset and stored in the RAM. In a preferred embodiment, the present value $P_0$ may be set based on the difference in pressure between the upstream side and the downstream side of the throttle valve in the intake passage when the operator decelerates the planing boat 10 by operating the accelerator to move the throttle valve toward the closed position. When the planing boat 10 abruptly decelerates, and the upstream side of the throttle valve in the intake passage excessively increases in pressure, the supercharger 36 may be damaged. Thus, the blow-off valve 42 advantageously opens to release the compressed air into the blow-off passage 43.

Thus, the point at which the blow-off valve 42 opens is determined from the pressure within the surge thank 32, and is set as the preset pressure value $P_0$. With reference to FIG. 10, at step SI 12, if the planing boat 10 is planing while accelerating, or planing at a constant speed, and the pressure P within the surge tank 32 (detected by the pressure sensor 48) is not less than the preset value $P_0$, then "NO" is determined, and the programs go to step S118 and temporarily ends.

The program starts again from step S100 and proceeds through step S102 to step S112. In the meantime, the solenoid valve 44 remains switched to permit flow from the first pressure introducing passage 45, and the intake system 30 operates in accordance with this state. The planing boat 10 planes while accelerating or at a constant speed. If the operator manipulates the accelerator to move the throttle valve toward the closed position and the pressure P within the surge tank 32 becomes less than the preset value $P_0$, then "YES" is determined in step S112 and the program goes to step S114.

At step S114, the solenoid valve 44 switches to permit flow from the second pressure introducing passage 46. The blow-off valve 42 is thus disconnected from the first pressure introducing passage 45 and now communicates with the second pressure introducing passage 46. Under these circumstances, one end of the second pressure introducing passage 46 communicates with the air duct 33 through the solenoid valve 44 and the blow-off valve 42, and the other end of the passage 46 communicates with the surge tank 32. The blow-off valve 42 remains open as long as the pressure in the intake passage on the upstream side of the throttle valve (in the air duct 33) exceeds the sum of the forces provided by the pressure within the surge tank 32 and the spring member 42b.

Thus, the blow-off valve 42 remains closed when the planing boat 10 is planing at a generally constant speed, and opens when the planing boat 10 is planing while decelerating. The blow-off valve 42 thus allows the planing boat 10 to keep planing without damage to the supercharger 36 or other components in the intake system 30. The program continues to step S116, where the state of the solenoid valve 44 being switched to permit flow from the second pressure introducing passage 46 is stored in RAM. Then, the program goes to step S118 and temporarily ends.

When the planing boat 10 decelerates to a stop, the solenoid valve 44 remains switched to permit flow from the second pressure introducing passage 46. When the planing boat 10 accelerates again, the processes of the preceding step S102 and steps thereafter are sequentially conducted through the operator's manipulation of the accelerator, so that the planing boat 10 quickly starts planing again while accelerating. When the planing boat 10 stops, the pressure within the surge tank 32 decreases, and the solenoid valve 44 switches to permit flow from the second pressure introducing passage 46.

In the intake system 30 in accordance with the embodiment described above, the blow-off valve 42 opens and closes based on the pressure within the surge tank 32. However, the blow-off valve 42 is forcibly closed when the rate-of-change of throttle opening exceeds the preset rate-of-change value $\alpha_0$ as a result of the operator manipulating the accelerator to accelerate the planing boat 10. The closed blow-off valve 42 advantageously allows most of the air that flows through the intake passage to be supplied to the engine 20 without leaking into the blow-off passage 43, so that response from the engine 20 improves. Thus, acceleration performance of the planing boat 10 improves.

Further, in accordance with the embodiment of the intake system 30 described above, the blow-off valve 42 is advantageously actuated by the pressure from the introducing passages 45, 46. This configuration requires no additional apparatus for actuating the blow-off valve 42, thereby reducing the size, complexity and cost of the intake system 30. Further, the single solenoid valve 44 obviates the need for first and second control valves, thereby further reducing the size, complexity and cost of the intake system 30. Furthermore, the pulser 49 determines whether or not the planing boat 10 is planing, based on the engine speed N. This configuration enables an accurate determination to be made as to whether or not the planing boat 10 is planing, using a simple and inexpensive device.

In accordance with the embodiment of the intake system 30 described above, the solenoid valve 44 permits flow from the second pressure introducing passage 46 when the detection value from the pressure sensor 48 becomes less than the preset pressure value $P_0$. This configuration prevents an increase in pressure on the upstream side of the throttle valve in the intake passage, and thus prevents damage to the supercharger 36 and other components of the intake system 30. Further, in the intake system 30 in accordance with this embodiment, the blow-off valve 42 is attached to the intercooler 35. This configuration requires no apparatus to connect the blow-off valve 42 to the intercooler 35, thereby further reducing the size, complexity and cost of the intake system 30.

Those of ordinary skill in the art will appreciate that the present intake system for a supercharged engine is not limited to the embodiment described above and can be practiced with appropriate modifications. For example, in the foregoing embodiment, the solenoid valve 44 permits flow from the first pressure introducing passage 45 when the rate-of-change of a throttle opening a is greater than the preset rate-of-change value $\alpha_0$ and the engine speed N is less than the preset speed value No, as shown in steps S104 and S106 of FIG. 10. However, the step S106 may be omitted, for example. In such a case, the solenoid valve 44 permits flow from the first pressure introducing passage 45 when the rate-of-change of a throttle opening a becomes greater than the preset rate-of-change value $\alpha_0$. Further, the preset rate-of-change value $\alpha_0$, in this case, may be set to be the same as or different from the preset rate-of-change value $\alpha_0$ in the case where the program shown in FIG. 10 is executed.

Further, the foregoing embodiment includes a three-way switching solenoid valve 44. However, in place of the solenoid valve 44, first and second control valves configured as separate components may be used. Further, in the foregoing embodiment the intake system 30 is disposed in the planing boat 10. However, in place of the planing boat 10, the intake system 30 may be used in other vehicles having supercharged engines, such as automobiles and motorcycles. Further, the layout, structure and materials of the components in the intake system according to the embodiments above may be modified as appropriate.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An intake system for a supercharged engine, comprising:
   an intake passage configured to supply air to the engine;
   a supercharger disposed in the intake passage and configured to compress the air supplied to the engine;
   a throttle valve disposed in the intake passage downstream from the supercharger, and configured to regulate a volume of the air supplied to the engine;
   a blow-off passage configured to provide fluid communication between an upstream side of the throttle valve and an upstream side of the supercharger;
   a blow-off valve configured to open and close the blow-off passage;
   a throttle rate-of-change detecting device configured to detect a rate-of-change of a throttle valve opening; and
   a blow-off valve control system configured to control actuation of the blow-off valve based on pressure on a downstream side of the throttle valve, and to actuate the blow-off valve to close the blow-off passage when a detection value from the throttle rate-of-change detecting device when the throttle valve is opened exceeds a preset rate-of-change value.

2. The intake system for a supercharged engine according to claim 1, wherein the blow-off valve control system comprises:
   a first pressure introducing passage configured to provide fluid communication between the upstream side of the throttle valve and the blow-off valve;
   a second pressure introducing passage configured to provide fluid communication between the downstream side of the throttle valve and the blow-off valve; and
   a control section configured to control opening and closing of the first and second pressure introducing passages;
   wherein the blow-off valve is configured to be actuated by pressure from the first and the second pressure introducing passages, and the control section is configured to open the first pressure introducing passage and close the second pressure introducing passage when the detection value from the throttle rate-of-change detecting device exceeds the preset rate-of-change value, and to close the first pressure introducing passage and open the second the pressure introducing passage when the detection value from the throttle rate-of-change detecting device becomes equal to or less than the preset rate-of-change value.

3. The intake system for a supercharged engine according to claim 2, wherein the control section comprises a switching solenoid valve.

4. The intake system for a supercharged engine according to claim 1 in combination with a planing boat, and further comprising a planing state determination means configured to determine whether or not the planing boat is planing;
wherein when the detection value from the throttle rate-of-change detecting device exceeds the preset rate-of-change value, and the planing state determination means determines that the planing boat is not planing, the blow-off valve control system actuates the blow-off valve to close the blow-off passage.

5. The intake system for a supercharged engine according to claim 4, wherein the planing state determination means comprises an engine speed detecting device, and the planing boat is determined not to be planing when the detection value from the throttle rate-of-change detecting device is greater than the preset rate-of-change value and a detection value from the engine speed detecting device is less than a preset speed value.

6. The intake system for a supercharged engine according to claim 5, wherein the engine speed detecting device comprises a pulser.

7. The intake system for a supercharged engine according to claim 1, wherein the blow-off valve control system further comprises a pressure detecting device configured to detect pressure on the downstream side of the throttle valve, and when the detection value from the throttle rate-of-change detecting device exceeds the preset rate-of-change value and the blow-off valve control system actuates the blow-off valve to close the blow-off passage, when the detection value from the pressure detecting device becomes less than a preset pressure value, the blow-off valve control system releases control to actuate the blow-off valve to close the blow-off passage.

* * * * *

UNITED STATES PATENT AND TRADEMARK OFFICE
CERTIFICATE OF CORRECTION

PATENT NO. : 7,404,293 B2
APPLICATION NO. : 11/186477
DATED : July 29, 2008
INVENTOR(S) : Shigeyuki Ozawa It is certified that error appears in the above-identified patent and that said Letters Patent is hereby corrected as shown below:

In Column 1, Line 66, after "passage. A", please delete "the".

In Column 2, Line 1, please delete "blow off" and insert -- blow-off --, therefor.

In Column 2, Line 16, please delete "including" and insert -- include --, therefor.

In Column 3, Line 65, please delete "includes" and insert -- include --, therefor.

In Column 4, Line 23, please delete "37b as" and insert -- 37b, as --, therefor.

In Column 4, Line 44, please delete "ca" and insert -- can --, therefor.

In Column 4, Line 51, please delete "rotates" and insert -- rotate --, therefor.

In Column 5, Line 43, after "piston", please insert -- 25 --.

In Column 5, line 51, after "used", please insert -- . --.

In Column 5, Line 52, after "FIG. 9", please insert -- , --.

In Column 5, Line 59, after "valve", please insert -- body --.

In Column 5, Line 62, please delete "includes" and insert -- include --, therefor.

In Column 7, Line 56, please delete "stem" and insert -- stern --, therefor.

In Column 7, Line 67, please delete "stem" and insert -- stern. --, therefor.

In Column 8, Line 4, please delete "stem" and insert -- stern --, therfor.

In Column 8, Line 12, please delete "planning" and insert -- planing --, therefor.

In Column 8, Line 20, please delete "planning" and insert -- planing --, therefor.

In Column 8, Line 34, please delete "detected" and insert -- (detected --, therefor.

In Column 8, Line 38, please delete "permit" and insert -- permits --, therefor.

In Column 8, Line 48, after "-change", please delete "change".

In Column 8, Line 48, please delete "a," and insert -- $\alpha$, --, therefor.

In Column 8, Line 49, after "sensor", please insert -- 47, is greater than a preset --.

In Column 8, Line 51, please delete "a," and insert -- $\alpha$, --, therefor.

In Column 8, Line 58, please delete "a," and insert -- $\alpha$, --, therefor.

In Column 8, Line 58, please delete "of change" and insert -- of-change --, therefor.

In Column 9, Line 1, please delete "a," and insert -- $\alpha$, --, therefor.

In Column 9, Line 6, please delete "$N_0$" and insert -- N, --, therefor.

UNITED STATES PATENT AND TRADEMARK OFFICE
CERTIFICATE OF CORRECTION

PATENT NO. : 7,404,293 B2
APPLICATION NO. : 11/186477
DATED : July 29, 2008
INVENTOR(S) : Shigeyuki Ozawa It is certified that error appears in the above-identified patent and that said Letters Patent is hereby corrected as shown below:

In Column 9, Line 20, please delete "No." and insert -- $N_0$. --, therefor.

In Column 9, Line 67, please delete "S 102" and insert -- S102 --, therefor.

In Column 10, Line 3, please delete "present" and insert -- preset --, therefor.

In Column 10, Line 5, please delete "present" and insert -- preset --, therefor.

In Column 10, Line 19, please delete "S1 12" and insert -- S112 --, therfor.

In Column 10, Line 23, please delete "programs go" and insert -- program goes --, therefor.

In Column 11, Line 49, please delete "a," and insert -- α, --, therefor.

In Column 11, Line 51, please delete "No," and insert -- $N_0$, --, therefor.

In Column 11, line 55, please delete "a," and insert -- α, --, therefor.

In Column 12, Line 67, in Claim 2 before "pressure", please delete "the".

Signed and Sealed this

Seventh Day of April, 2009

JOHN DOLL
*Acting Director of the United States Patent and Trademark Office*